US012800303B2

(12) United States Patent
Komagamine et al.

(10) Patent No.: US 12,800,303 B2
(45) Date of Patent: Nov. 17, 2026

(54) TILT ANALYSIS SYSTEM, TILT ANALYSIS METHOD, STORAGE MEDIUM STORING TILT ANALYSIS PROGRAM, AND SURVEY TARGET DEVICE

(71) Applicant: Topcon Corporation, Tokyo (JP)

(72) Inventors: Kunpei Komagamine, Tokyo (JP); Toshio Yamada, Tokyo (JP); Nobuyuki Nishita, Tokyo (JP)

(73) Assignee: Topcon Corporation, Tokyo (JP)

( * ) Notice: Subject to any disclaimer, the term of this patent is extended or adjusted under 35 U.S.C. 154(b) by 1158 days.

(21) Appl. No.: 17/455,416

(22) Filed: Nov. 18, 2021

(65) Prior Publication Data

US 2022/0155068 A1 May 19, 2022

(30) Foreign Application Priority Data

Nov. 19, 2020 (JP) ................................ 2020-192440

(51) Int. Cl.
*G01C 9/06* (2006.01)
*G01S 17/42* (2006.01)

(52) U.S. Cl.
CPC ................ *G01C 9/06* (2013.01); *G01S 17/42* (2013.01); *G01C 2009/066* (2013.01)

(58) Field of Classification Search
CPC .. G01C 2009/066; G01C 15/02; G01B 11/26; G01S 7/4808
See application file for complete search history.

(56) References Cited

U.S. PATENT DOCUMENTS 5,772,158 A * 6/1998 Blanding ................. H02G 7/05 174/45 R
2019/0154439 A1* 5/2019 Binder .................... G01S 15/42

FOREIGN PATENT DOCUMENTS

CA 2095761 C * 6/1996 ............. E04H 12/20
JP H05133748 A 5/1993

(Continued)

OTHER PUBLICATIONS

Notice of Reasons for Refusal mailed Aug. 6, 2024 in connection with Japanese Patent Application No. 2020-192440, 10 pgs. (including translation).

(Continued)

*Primary Examiner* — Helal A Algahaim
*Assistant Examiner* — Clara G Chilton
(74) *Attorney, Agent, or Firm* — Chiesa Shahinian & Giantomasi PC

(57) ABSTRACT

A tilt analysis system including: a surveying device configured to survey a position of a survey target device by irradiating the survey target device with surveying light, the survey target device including an attachment portion to be attached to a columnar object, and a reflector that reflects the surveying light; a portable terminal device; a reference value acquisition unit configured to acquire a first point obtained by surveying the position of the survey target device attached to a bottom of the columnar object; a column top value acquisition unit configured to acquire a second point obtained by surveying the position of the survey target device attached to the top of the columnar object; a tilt analysis unit configured to generate tilt information indicating in which direction the columnar object tilts; and a tilt information output unit configured to output the tilt information generated by the tilt analysis unit.

2 Claims, 9 Drawing Sheets

(56) References Cited

FOREIGN PATENT DOCUMENTS

| | | | | |
|---|---|---|---|---|
| JP | H07301530 | A | | 11/1995 |
| JP | H08122071 | A | | 5/1996 |
| JP | H09203210 | A | | 8/1997 |
| JP | 2000-275044 | A | | 10/2000 |
| JP | 2007078601 | A | | 3/2007 |
| JP | 2017116437 | A | | 6/2017 |
| JP | 2017151013 | A | * | 8/2017 |
| JP | 2019039247 | A | * | 3/2019 |

OTHER PUBLICATIONS

Notice of Reasons for Refusal mailed Jan. 7, 2025 in connection with Japanese Patent Application No. 2020-192440, 6 pgs. (including translation).

* cited by examiner

TILT ANALYSIS SYSTEM, TILT ANALYSIS METHOD, STORAGE MEDIUM STORING TILT ANALYSIS PROGRAM, AND SURVEY TARGET DEVICE

BACKGROUND

The present disclosure relates to a tilt analysis system, a tilt analysis method, a storage medium storing a tilt analysis program, and a survey target device.

At construction sites of building structures composed of multiple pillars and columns, the column members such as steel columns have been roughly assembled (i.e., erected), and then erection adjustment work is performed to adjust the column members more accurately to be perpendicular to the horizontal plane.

As the technique of measuring the verticality of each column member in the erection adjustment work, there are some techniques such as one using a plumb bob or one using a surveying instrument such as a transit which measures the verticality of the column member in two directions. There is the method of grasping displacement of the position of a column using various measuring methods or measuring devices (e.g., Japanese Unexamined Patent Publication No. 2000-275044).

There is also the system for measuring the tilt amount of a column member (e.g., Japanese Unexamined Patent Publication No. 2019-039247) where a center position of the column member is determined by using a design value which has been input in advance, the position of the column member is actually measured by using a surveying instrument after erection adjustment work of the column member, and then the tilt amount is calculated based on the center position and the actual position of the column member.

SUMMARY

Due to recent labor shortage in a construction industry, work style reforms, worldwide spread of infectious diseases, etc., labor saving has been required at construction sites. In the current technique of measuring the verticality using a typical transit, each column basically requires one transit. In the current erection adjustment work, moreover, an operator such as a scaffold constructor pulls a wire hung on two columns to adjust the tilts of the columns while another person such as an observer observes the tilts of the columns. So, this work requires multiple people, including an observer and the operator.

Multiple operators are still required with use of the system disclosed in Japanese Unexamined Patent Publication No. 2019-039247, for example, which further requires pre-work to input design values in advance. In a case where the erection position of the column member is changed by, e.g., on-site adjustment, work such as re-input of design values is required.

In view of the foregoing, an objective of the present disclosure is to provide a tilt analysis system, a tilt analysis method, a storage medium storing a tilt analysis program, and a survey target device so that erection adjustment work of a columnar object after erection can be made easier and can be done even by one person.

In order to achieve the objective, a tilt analysis system of the present disclosure includes: a surveying device configured to survey a position of a survey target device by irradiating the survey target device with surveying light; the survey target device including an attachment portion to be attached to the columnar object and a reflector that reflects the surveying light; a reference value acquisition unit configured to acquire, as a reference value, a first point obtained by surveying the position of the survey target device attached to a bottom of the columnar object, using the surveying device; a column top value acquisition unit configured to acquire, as a column top value indicating a position of a column top, a second point obtained by surveying the position of the survey target device attached to the top of the columnar object, using the surveying device; a tilt analysis unit configured to generate tilt information including a tilt direction based on the reference value acquired by the reference value acquisition unit and the column top value acquired by the column top value acquisition unit, the tilt direction indicating in which direction the columnar object tilts; and a tilt information output unit configured to output, to an output unit of a portable terminal device, the tilt information generated by the tilt analysis unit.

In order to achieve the objective, a tilt analysis method of the present disclosure includes: first point surveying of irradiating a survey target device with surveying light to survey a first point with reflected light, using a surveying device, the survey target device including: an attachment portion to be attached to a bottom of the columnar object; and a reflector, the reflected light being the surveying light reflected by the reflector; reference value acquisition of acquiring, as a reference value, the first point surveyed by the surveying device, using a reference value acquisition unit; second point surveying of surveying a second point of the survey target device attached to a top of the columnar object, using the surveying device; column top value acquisition of acquiring, as a column top value indicating a position of a column top, the second point surveyed by the surveying device, using a column top value acquisition unit; tilt analysis of generating tilt information including a tilt direction based on the reference value acquired in the reference value acquisition and the column top value acquired in the column top value acquisition, using a tilt analysis unit, the tilt direction indicating in which direction the columnar object tilts; and tilt information output of outputting the tilt information to an output unit of a portable terminal device, using a tilt information output unit.

In order to achieve the objective, a storage medium storing a tilt analysis program according to the present disclosure is for analyzing a tilt of a columnar object. The tilt analysis program causes a computer to execute: first point surveying of irradiating a survey target device with surveying light to survey a first point with reflected light, using a surveying device, the survey target device including: an attachment portion to be attached to a bottom of the columnar object; and a reflector, the reflected light being the surveying light reflected by the reflector; reference value acquisition of acquiring, as a reference value, the first point surveyed by the surveying device, using a reference value acquisition unit; second point surveying of surveying a second point of the survey target device attached to a top of the columnar object, using the surveying device; column top value acquisition of acquiring, as a column top value indicating a position of a column top, the second point surveyed by the surveying device, using a column top value acquisition unit; tilt analysis of generating tilt information including a tilt direction based on the reference value acquired in the reference value acquisition and the column top value acquired in the column top value acquisition, using a tilt analysis unit, the tilt direction indicating in which direction the columnar object tilts; and tilt information output of outputting the tilt information to an output unit of a portable terminal device, using a tilt information output unit.

In order to achieve the objective, a survey target device of the present disclosure aims to analyze a tilt of a columnar object that is magnetic and has a rectangular cross section. The survey target device includes: a reflector configured to reflect surveying light back to a surveying device that surveys a position of the survey target device by irradiating the survey target device with the surveying light; and a first planar portion and a second planar portion that abut on a first side surface and a second side surface, respectively, which sandwich a corner of the columnar object. The first planar portion and the second planar portion are arranged perpendicularly to each other. The first planar portion and the second planar portion are magnetic.

In order to achieve the objective, a survey target device of the present disclosure aims to analyze a tilt of a columnar object that is magnetic and has, in advance, an alignment mark indicating a point in a direction in which the columnar object extends and in a circumferential direction. The survey target device includes: a reflector configured to reflect surveying light back to a surveying device that surveys a position of the survey target device by irradiating the survey target device with the surveying light; an attachment portion made of a magnetic material that exerts an attractive force on a side surface of the columnar object; and a guide configured to perform position matching with the alignment mark.

The present disclosure facilitates the erection adjustment work of a columnar object after erection, to be done even by one person.

DETAILED DESCRIPTION

Figure 1:
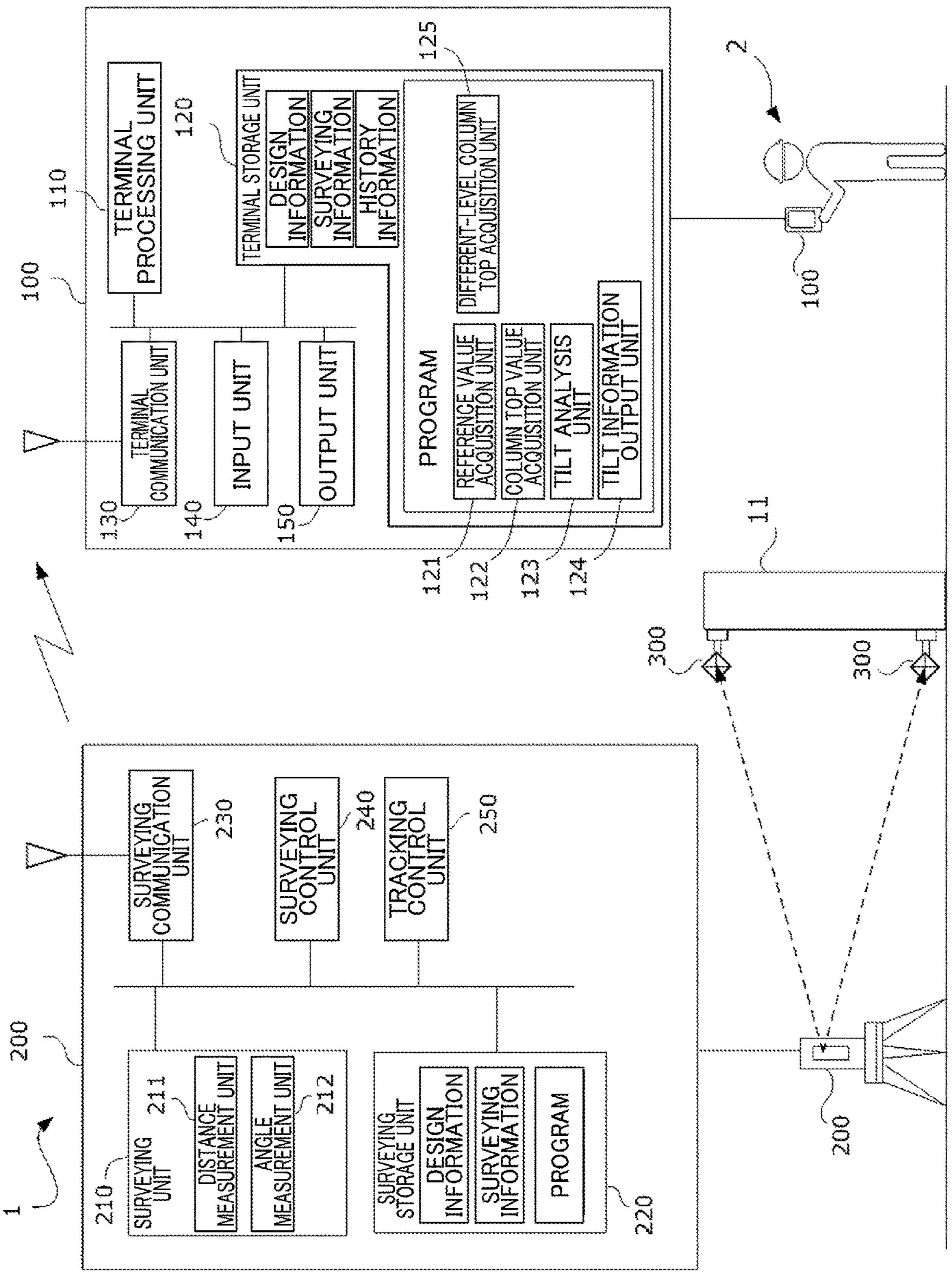
FIG. 1 shows a configuration of a tilt analysis system of an embodiment of the present disclosure.

An embodiment of the present disclosure will be described below with reference to the drawings.

<Configuration of System>

A tilt analysis system 1 includes a portable terminal device 100 used by an operator 2, a surveying device 200, and survey target devices 300. The operator 2 measures and analyzes the tilt of a columnar object 11 using the tilt analysis system 1 with such a configuration to adjust the tilt on site so that the column should become erected vertically.

The surveying device 200 is, according to one embodiment, a surveying instrument utilizing a light wave type, such as a total station (TS), which is placed on already known position coordinates. The "light wave type such as a TS" includes, in addition to the normal TSs, any measurement instruments capable of performing the similar measurement equivalent to that by the TSs; so, it may further include instruments with an automatic tracking function, or instruments using light waves but with no telescope. The surveying device 200 can automatically track the survey target device 300 as a target to survey any position of the survey target device 300.

Figure 2:
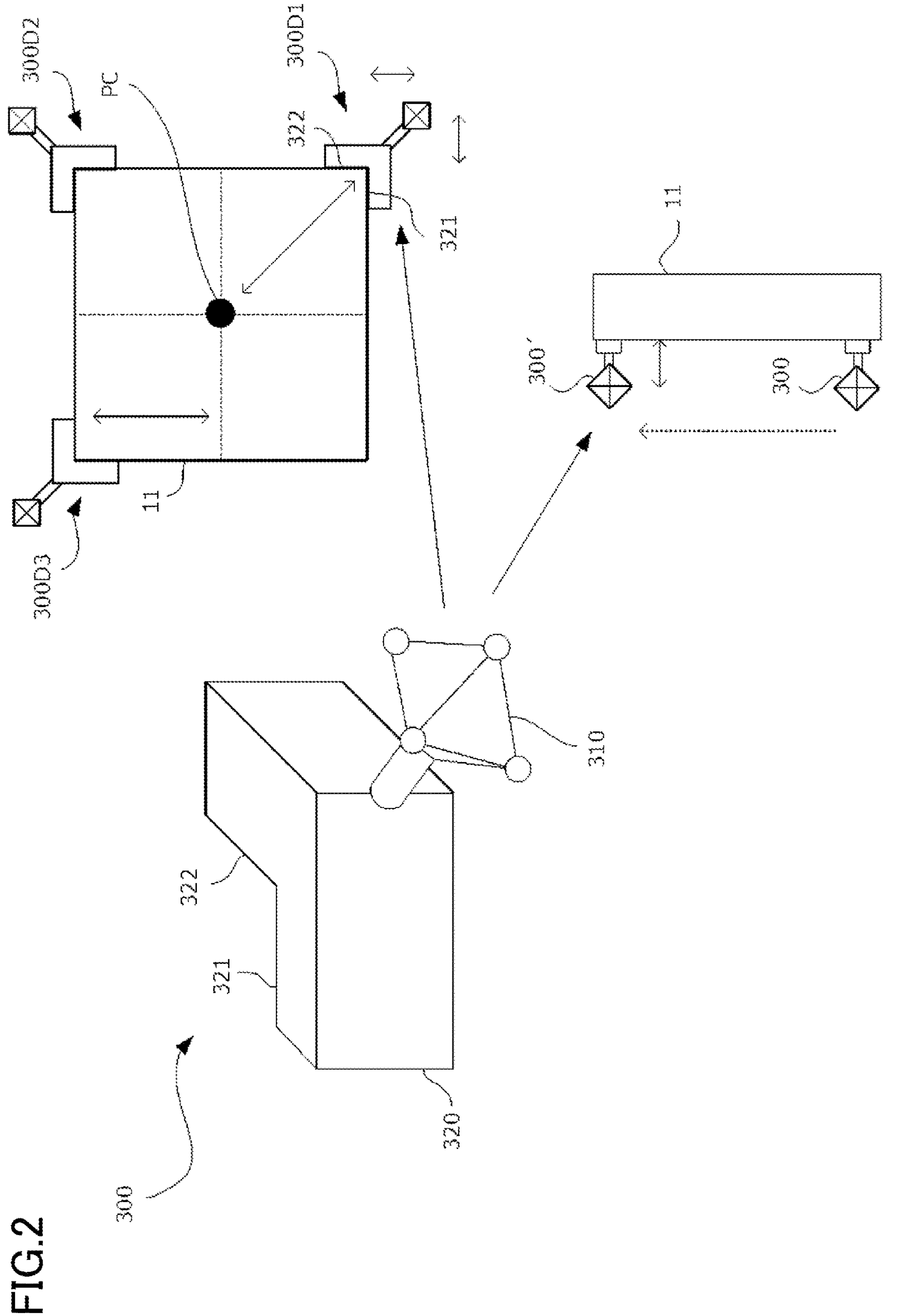
FIG. 2 illustrates an example survey target device mainly attached to a rectangular column.

The survey target device 300 includes an optical element that reflects light irradiated from the surveying device 200 back to the surveying device 200. FIG. 2 illustrates the survey target device 300 to be attached to a rectangular column. The survey target device 300 includes an attachment portion 320 to be attached to the columnar object and a reflector 310 that reflects the surveying light irradiated from the surveying device 200 back to the surveying device 200. The optical element serving as the reflector is called as a retroreflective prism as well. In a surveying industry and a construction-related industry, the survey target device 300 of this type is generally called a "prism." The details of the survey target device 300 will be described later.

Note that the surveying device 200 and the survey target device 300 are physically separated from each other, but they both fulfil the surveying function in cooperation with each other. So, the survey target device 300 may also be interpreted as being integrally included in the surveying device 200.

Referring back to FIG. 1, the surveying device 200 and the portable terminal device 100 will be described. The surveying device 200 includes a tripod and a horizontal rotation driving unit that is rotatably drivable in the horizontal direction. The surveying device 200 may further include a vertical rotation driving unit that is vertically rotatable on the horizontal rotation driving unit, and a telescope unit that is rotatably driven by the vertical rotation driving unit. Although not shown in FIG. 1, the surveying device 200 includes, as an angle measurement unit 212, a horizontal angle detection unit that detects a horizontal rotation angle and a vertical angle detection unit that detects a vertical rotation angle. These horizontal and vertical angle detection units enable to perform measurement of the horizontal and vertical angles of the collimation direction, respectively.

The surveying device 200 further includes, as a distance measurement unit 211, an electro-optical distance meter that measures a slope distance to the survey target device 300. For the sake of convenience, these angle and distance measurement units 212 and 211 will collectively be referred to as a "surveying unit 210."

The surveying device 200 further includes a surveying storage unit 220, a surveying communication unit 230, a surveying control unit 240, and a tracking control unit 250.

The surveying storage unit 220 may store, in advance, various programs for the surveying, tracking, or other controls; or information (e.g., the altitude) on the ground to be used at a construction site, design information, or other information. The surveying storage unit 220 may further store already-surveyed position coordinates.

The surveying communication unit 230 is communicative with external devices such as the portable terminal device 100, and is wireless communication means, for example.

The surveying control unit 240 functions to control the surveying by the surveying device 200. Specifically, the surveying control unit 240 automatically or manually collimates to sight the survey target device 300. The surveying control unit 240 detects the horizontal angle, the vertical angle, and the slope distance between the surveying device 200 and the survey target device 300, using the angle measurement unit (i.e., the horizontal and vertical angle detection units) 212 and the distance measurement unit 211 as described above. Here, the retroreflective prism, as an example of the reflector 310 of the survey target device 300, is attached to the columnar object 11 with a short space in between as shown in FIG. 2. The distances between the prism and the part 320 and between the prism and the surface of the column are known. Thus, the surveying control unit 240 corrects the horizontal angle, vertical angle, and slope distance detected by the angle and distance measurement units 212 and 211 to obtain, as surveying results, the position of the survey target device 300. The positions may be calculated as relative coordinates or absolute coordinates. As the relative coordinates, for example, the position of the object to be surveyed has a relative value viewed from the location of the surveying device 200.

The tracking control unit 250 controls the drive of the horizontal and vertical rotation driving units to irradiate tracking light and to continuously receive the tracking light reflected by the reflector 310 of the survey target device 300, thereby tracking the survey target device 300.

The survey target device 300 will be described more in detail with reference to FIG. 2. The attachment portion 320 of the survey target device 300 is an L-shaped magnetic block, for example, having, inside the corner of the L-shape, a first planar portion 321 and a second planar portion 322 that abut on the surfaces of the columnar object. These first and second planar portions 321 and 322 are arranged perpendicularly to each other. If the columnar object is a rectangular column, that is, a column with a rectangular cross section, the first and second planar portions 321 and 322 fit the corner of the column regardless of the size of the column. Note that even an H-beam steel has a corner to which the first and second planar portions 321 and 322 are applicable.

Most of the columnar objects in the construction sites are magnetic bodies such as steel frames. The attachment portion 320 made of a magnetic material, which exerts an attractive force on the columnar object (a columnar portion), not only facilitates attachment and detachment but also allows firm fixing without any movement during attachment and stable surveying. Use of such a survey target device 300 facilitates surveying of the position of the columnar object, especially the position of the corner of the column. Surveying of the center position of the column will be described later. Note that if the attachment portion 320 is attached to the columnar object 11 by another attachment means, the attachment portion 320 is not necessarily made of a magnetic material. For example, if the columnar object is made of wood, the attachment portion 320 may be made of not a magnetic material but a material suitable for wood.

Referring back to FIG. 1, examples of the portable terminal device 100 include a smartphone, a feature phone, a tablet, a handheld computer device (e.g., a personal digital assistant (PDA)), and a wearable terminal (e.g., a glasses-type device, a watch-type device, or a virtual reality (VR) terminal integrated with a head-mounted display). Alternatively, the portable terminal device 100 may be a portable laptop computer, for example. A general-purpose terminal with application software installed can be used as a portable display terminal of this embodiment. Such a portable terminal device 100 includes an output unit 150, and it is easily carriable at a work site. Information output to the output unit 150 may be checked hands-free or with one hand. The portable terminal device 100 may also include an internal power supply such as a battery and may thus be operatable for a certain period without requiring an external power supply.

The portable terminal device 100 includes a terminal communication unit 130, a terminal storage unit 120, a terminal processing unit 110, an input unit 140, and the output unit 150.

Although not shown in the figures, the terminal processing unit 110 executes the functions and/or methods implemented by codes or commands included in the programs stored in the terminal storage unit 120. Examples of the terminal processing unit 110 include a central processing unit (CPU), a microprocessor unit (MPU), a graphics processing unit (GPU), a microprocessor, a processor core, a multiprocessor, an application specific integrated circuit (ASIC), and a field-programmable gate array (FPGA). The terminal processing unit 110 may include a logic circuit or a dedicated circuit formed in an integrated circuit, for example, to execute the processing disclosed in the embodiment. These circuits may be one or more integrated circuits. A single integrated circuit may execute the plural types of processing described in the embodiment. Although not shown, the terminal processing unit 110 may include a main storage unit that temporarily stores the programs to be read out from the terminal storage unit 120 and provides a workspace to the terminal processing unit 110.

The terminal communication unit 130 can communicate with the surveying communication unit 230 of the surveying device 200, and can receive the surveying results, the position information, or other information. The surveying results are results of surveying the survey target device 300 using the surveying device 200. The position information is calculated using the surveying control unit 240. The position information may be calculated based on the surveying results by the surveying device 200 or the portable terminal device 100. Communication may be wired or wireless. As long as interactive communication is established, any communication protocol may be used.

The input unit 140 is any one or a combination of all types of devices capable of receiving inputs from a user, that is, the operator 2, to transmit the information of the inputs to the terminal processing unit 110. Examples include, in addition to hardware input means such as buttons, software input means displayed on an output unit such as a touch panel, and audio input means such as a remote controller or a microphone.

The output unit 150 is any one or a combination of all types of devices capable of displaying a screen when the output unit 150 serves as a display unit. Examples include a flat display such as a liquid crystal display or an organic light emitting diode (OLED) display, a curved display, a folding screen on a foldable terminal, a head-mounted display, or a device displayable through projection on a substance using a small projector. The output unit 150 may be an audio output device such as a speaker when the output unit 150 serves as an audio output unit. The output unit 150 may be a combination of a display unit and an audio output unit.

The terminal storage unit 120 functions to store various necessary programs or data. For example, the terminal storage unit 120 may store design information, surveying information, tilt information, and history information thereof. Stored as the surveying information can be the surveying information received by the terminal communication unit 130 and the position information calculated based on the surveying information. The terminal storage unit 120 further stores various necessary parameters. Examples of the parameters include calculation formulas or parameters for calculating acceptable tilt values, which will be described later, of the surveying device 200. The terminal storage unit 120 is any of various storage media such as a hard disk drive (HDD), a solid-state drive (SSD), and a flash memory.

The design information includes blueprints or ground information (e.g., the altitude) necessary for construction work. Examples of the construction work include construction of structures, such as buildings, roads, railroads, tunnels, bridges, ditches, waterways, and rivers, that require columns. The blueprints may include blueprints of buildings; linear data; point data; the positions, coordinates, and altitudes of the points and line segments; and the dimensions, such as the height or widths, of columnar objects. Note that the embodiment of the present disclosure is advantageous in analyzing the tilt of a columnar object because it does not require any design information, which requires no or little input work of the design information in advance.

The terminal storage unit 120 may also store tilt information, which will be described later, and history information thereof. The tilt information stored as the history include the positions, levels, tilt directions, and tilt amounts of the columnar objects, the analysis times (e.g., the analysis dates and times) when analyzing tilts, and information on the user of the system, in association with each other. For example, the tilt information at an analysis time is output and stored in accordance with a predetermined format, such as an inspection form, for checking the current states or the states after work.

The terminal storage unit 120 stores, as application software programs, a reference value acquisition unit 121, a column top value acquisition unit 122, a tilt analysis unit 123, a tilt information output unit 124, and a different-level column top value acquisition unit 125 that fulfil such functions described below.

The reference value acquisition unit 121 functions to acquire, as a reference value, a first point obtained by surveying the position of the survey target device 300 attached to the bottom of the columnar object 11 using the surveying device 200. The reference value acquisition unit 121 also functions to acquire, as a reference value, a column top value of a columnar object connected directly below a different-level columnar object.

The column top value acquisition unit 122 functions to acquire, as a column top value indicating the position of the column top, a second point obtained by surveying the position of the survey target device 300 attached to the top of the columnar object 11 using the surveying device 200.

The tilt analysis unit 123 functions to calculate and generate tilt information including a tilt direction based on the reference value acquired by the reference value acquisition unit 121 and the column top value acquired by the column top value acquisition unit 122. The tilt direction indicates in which direction the columnar object 11 tilts.

The tilt analysis unit 123 also functions to calculate and generate tilt information including a tilt direction based on the reference value and a different-level column top value acquired by the different-level column top value acquisition unit 125. The tilt direction indicates in which direction the different-level columnar object tilts.

The tilt information output unit 124 functions to display, on the output unit, the tilt information generated by the tilt analysis unit 123.

The different-level column top value acquisition unit 125 functions to acquire, as the different-level column top value, a third point obtained by surveying the position of the survey target device 300 attached to the top of the different-level columnar object connected onto a different level, using the surveying device 200. The different level is a level directly above and different from the level of the columnar object for which the reference value acquisition unit 121 has acquired the reference value.

<Flow of Processing>

Figure 4:
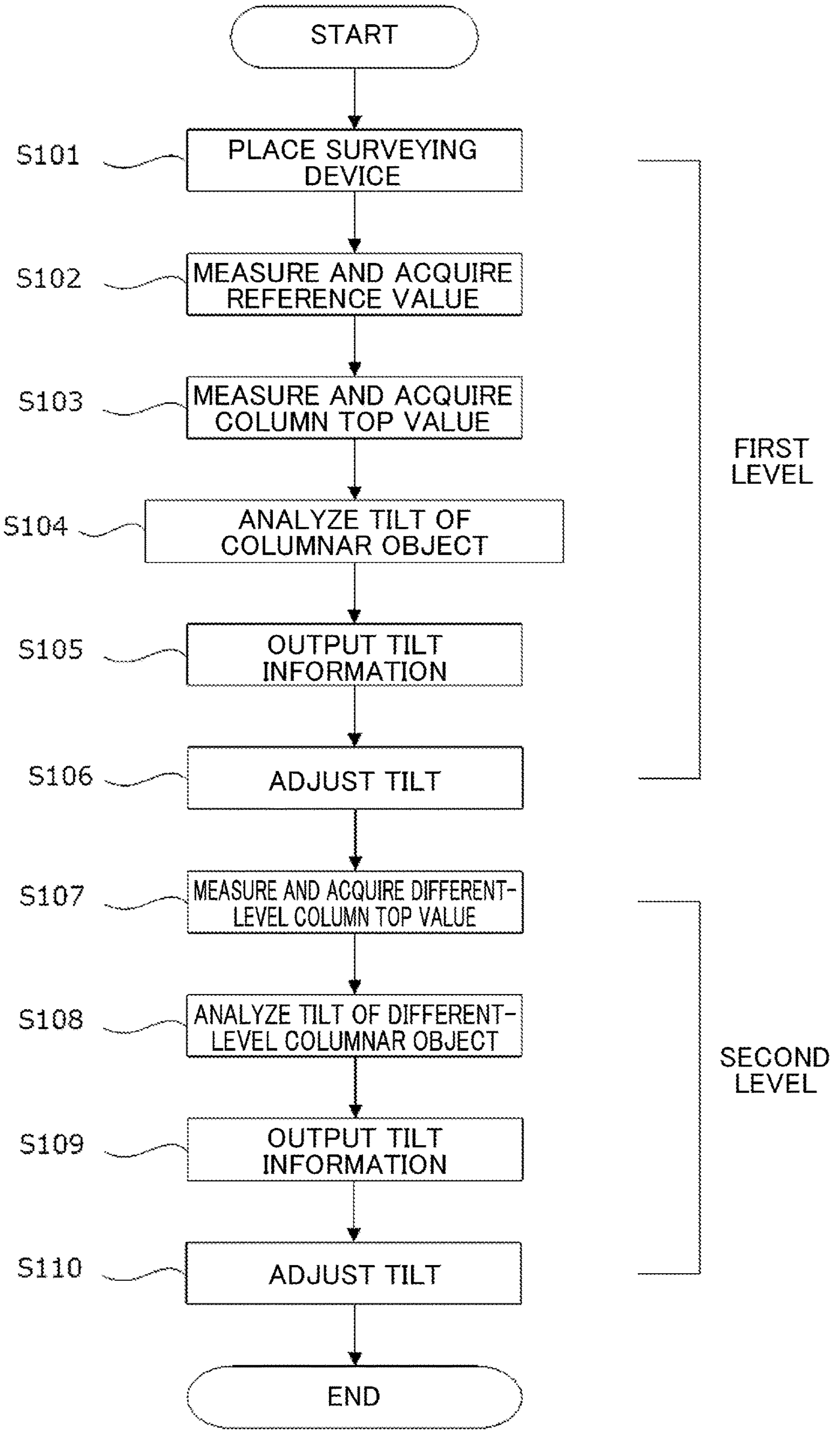
FIG. 4 is a flowchart illustrating the flow of the processing according to a tilt analysis method and a tilt analysis program using the tilt analysis system of the embodiment of the present disclosure.

FIG. 4 shows a flowchart illustrating the flow of the processing according to a tilt analysis method and a tilt analysis program using the tilt analysis system of the embodiment of the present disclosure.

First, in step S101, the surveying device 200 is placed in any place at a construction site to set a device point. In one preferred embodiment, the surveying device 200 is placed where a target columnar object is visible from the surveying device 200. Here, for setting the device point, a local coordinate system of the surveying device 200 is adequate. The local coordinate system is set as follows. The XYZ coordinates of any point in the local coordinate system are given to the surveying device 200, and the directions of the coordinate axes are set. Here, among the XYZ-axes, the XY-axes form the plane of the construction site and the Z-axis extends perpendicularly to the plane of the construction site. For example, if a certain place is set as the origin of the local coordinates of the surveying device 200, the XYZ coordinates of the certain place is set as (0, 0, 0).

Figure 3:
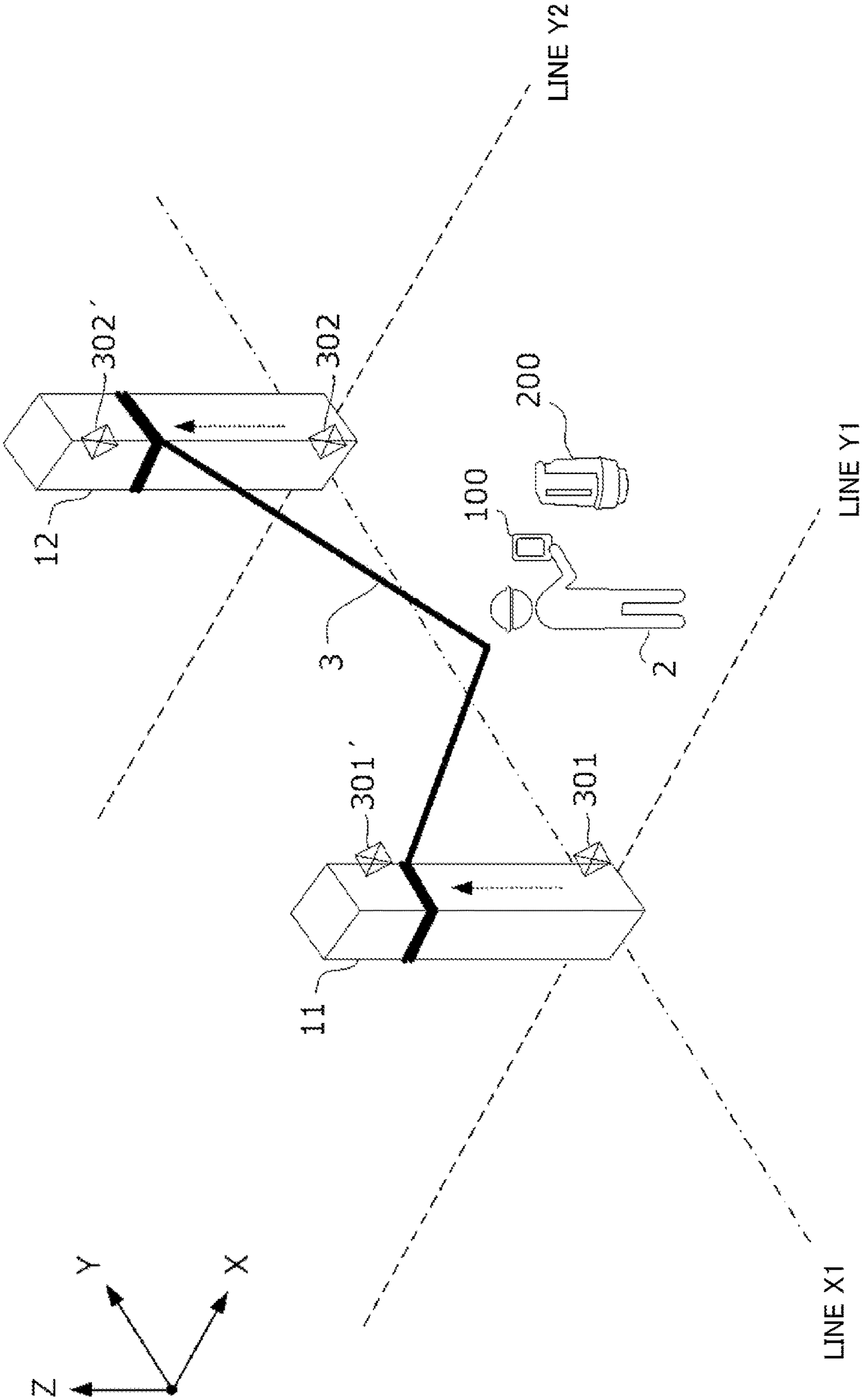
FIG. 3 illustrates erection of a columnar object according to the embodiment of the present disclosure.

In the local coordinate system, the position of the columnar object to be surveyed by the surveying device 200 is not represented by an absolute coordinate value as in the coordinate system of a whole construction site (referred to as a “global coordinate system” hereafter). Instead, a relative coordinate value viewed from the surveying device 200 is used. Even with use of the relative value in the embodiment of the present disclosure, the values of the tilt and height of the columnar object can be calculated properly because the columnar object is basically surveyed at two points, the tilt is calculated based on values of the XY coordinates of the two points, which are both shifted in the same manner, and the height is calculated based on a difference between the Z coordinates of the two points. Even with use of the relative value, the arrangement and locations of a plurality of columnar objects can be output after surveying the positions of the columnar objects at respective reference positions and acquiring respective reference values. Even with such the output tilt information, it is adequate for grasping the arrangement of the columnar objects. Accordingly, the surveying device 200 can be placed in any place without using any known position, which allows easier start of surveying. FIG. 3 is a view illustrating erection work of a columnar object according to the embodiment of the present disclosure. The surveying device 200 is placed in any place at a construction site. The placement and setting works can be done all by the operator 2 him/herself alone.

Generally, the directions of the coordinate axes in the local coordinate system are set based on the true north. In the embodiment of the present disclosure, however, the coordinate axes may be set in any directions. Here will be described some examples of the direction in which the surveying device 200 as follows: The surveying device 200 may be roughly aligned based on a direction along/against a surface of the columnar object, roughly aligned in the alignment direction of a plurality of columnar objects, or roughly aligned in the direction (e.g., upward from the output unit 150) in which the surveying result is displayed on the output unit 150 of the portable terminal device 100, which will be described later. Accordingly, the XY-axes of the local coordinate system may be set based on such directions of the examples.

Note that the device point may be set using a global coordinate system as in a typical case. As what is called as "any point placement for setting the device point," the device may be set at any point, and two or more points may be then surveyed by backward intersection. Alternatively, as "known point placement," the device may be set using known points.

In step S101, the operator 2 may use, as a user, the input unit 140 of the portable terminal device 100 to log in the system. Accordingly, user information will be associated with the tilt information which is to be calculated and analyzed later.

In step S102, the operator 2 places survey target devices 301 and 302 at the bottoms of the columnar objects 11 and 12, respectively, to be surveyed. The operator 2 then uses the surveying device 200 to irradiate each of the survey target devices 301 and 302 with surveying light to survey them as a first point. The reference value acquisition unit 121 acquires this first point as a reference value. The reference value is applicable to the tilt analysis of a columnar object not only on the first level but also on the higher levels such as second, third, and N-th levels, where N is a natural number. Hereafter, an example will be described where the two columnar objects 11 and 12 are surveyed at the same time to analyze the tilts, but alternatively, the tilts of the columnar objects may be analyzed one by one, or the tilts of three or more columnar objects may be analyzed at the same time.

Note that in such tilt analysis of a columnar object, not only the column top is surveyed, but also the actual column bottom and top are both surveyed. This allows accurate analysis of the tilt of the actual column without using any design information. In particular, the reference and column top values actually measured at an actual site are used to indicate the bottom and top of the same columnar object. This further realizes the accuracy of the tilt analysis. In one more preferred embodiment, the column bottom and top of the same corner of the same columnar object are analyzed using survey values. This further improves the accuracy of the tilt analysis without using any design information such as an offset, which will be described later.

In step S103, subsequently, the operator 2 detaches the survey target devices 301 and 302 from the bottoms of the columnar objects 11 and 12, and attaches the survey target devices 301 and 302 as survey target devices 301' and 302' to the column tops. The operator 2 then surveys each second point using the surveying device 200. Note that the survey target devices 301 and 302 are not necessarily the identical survey target device 300 as the survey target devices 301' and 302', respectively. However, the identical survey target devices 300 may be used more advantageously, since there is no need to consider any very slight displacement caused by individual differences of the survey target devices 300. The survey target device 301 is not necessarily detached and then reattached, and both the survey target devices 301 and 301' may be attached to the respective points at the same point.

The column top value acquisition unit 122 then acquires the surveyed second point as a column top value indicating the position of each column top. Each pair of the survey target devices 301 and 301' and the survey target devices 302 and 302' is placed and surveyed basically at the same corner of the same columnar object that is a rectangular column. Other variations will be described later. In one preferred embodiment, the column bottom and top are located as close as possible to the ends of a columnar object. The survey target devices 300 could be attached to the points recognized to be the column bottom and top by the operator 2's own decision on site.

The tilt of the columnar object 11 is analyzed based on the positions of the survey target devices 301 and 301'. The tilt of the columnar object 12 is analyzed based on the positions of the survey target devices 302 and 302'. There is thus no need to align the heights of the survey target devices 301 and 302 with the heights the survey target devices 301' and 302', respectively.

In step S104, the tilt analysis unit 123 calculates to generate tilt information including each tilt direction based on the reference value acquired in step S102 and the column top value acquired in step S103. The tilt directions indicate in which direction each of the columnar objects 11 and 12 tilts. Each tilt is analyzed as follows: For example, the tilt analysis unit 123 calculates how the column top value is different from the reference value, using the XYZ position coordinates of the reference and column top values, and calculates the tilt information based on the amount of the difference.

The tilt analysis unit 123 calculates, as the tilt information, the tilt direction and the tilt amount using the XY position coordinates of the reference and column top values. According to one method, the tilt analysis unit 123 divides the coordinates into the X- and Y-components to calculate the respective differences. For example, if the difference in the X coordinate between the reference and column top values is +4 mm, the tilt information indicates that the column tilts 4 mm in the X-direction. If the difference in the Y coordinate is +5 mm, the tilt information indicates that the column tilts 5 mm in the Y-direction. This method clarifies in which plane direction and how much each surface of the columnar object is to be corrected at the time of erection adjustment, which facilitates adjustment using a correction jig at a joint of the columnar object. According to another method, the X- and Y-components of the coordinates are integrally regarded as a vector and calculated. Using the example described above, if the reference value is assumed to be (0, 0), the tilt direction and the tilt amount are indicated by the vector of (0, 0) to (+4 mm, +5 mm). This method clarifies in which direction (i.e., opposite to the tilt direction) and how much the columnar object is to be directly pulled with a wire rope or a piano wire at the time of erection adjustment. This facilitates adjustment with a wire rope or other tools.

The tilt analysis unit 123 also calculates the height of a columnar object using the difference between the Z coordinate values of the reference value and of the column top value. Accordingly, an approximate height of the columnar object can be taken from the survey and the calculation, even if there is no height information of columnar object in the design information. Next, the tilt analysis unit 123 reads the calculation formulas and parameters necessary for calculating the acceptable tilt amount from the terminal storage unit 120, and the unit calculates an acceptable tilt amount of the columnar object using the calculated height of the column object. Here, the acceptable tilt amount is the accuracy criteria of the tilt amount of each columnar object. The tilt amount of a columnar object needs to fall within this acceptable amount at the time of erection adjustment. The acceptable tilt amount varies depending on the erection accuracy criteria determined in accordance with a construction site. According to a certain standard specification related to a steel frame construction, the acceptable tilt amount is as follows: As a control tolerance, the amount of tilting of a column needs to fall within 1/1000 of the height of the column and within 10 mm. As a limit tolerance, the amount of tilting of a column needs to fall within 1/700 of the height of the column and within 15 mm. Here, the parameters such as a divisor such as 1/1000 and a constant such as 10 mm vary depending on a construction site. In the embodiment of the present disclosure, these calculation formulas and parameters are input and stored in advance in the terminal storage unit 120, and flexibly changeable.

The survey target devices 301 and 301' are attached to the same corner of the same columnar object 11. Here, the "same corner" means anywhere of the same corner vertically along the column. A columnar object such as a steel frame is manufactured significantly precisely so that its tilt could be calculated on the assumption that there is basically no deformation of the columnar object. Even if a columnar object is deformed very slightly, for example, the deformation may be corrected in erection work. Since the survey target devices 300 are attached to the same corner of the same columnar object, the tilt information can be calculated without requiring any design information of the columnar object.

As a variation of the embodiment, tilt analysis will be described with reference to FIG. 2 where the survey target devices 301 and 301' are attached to different corners of the same columnar object 11. Note that the vertical, horizontal, right, and left directions in FIG. 2 are those when the figure is oriented to make the letters readable properly. The upper right of FIG. 2 shows that a plurality of survey target devices 300 are placed and attached on a vertical cross section of the columnar object 11. In this figure, the survey target device 300 at the lower right corner is referred to as a survey target device 300D1, at the upper right corner as a survey target device 300D2, and at the upper left corner as a survey target device 300D3, for example. Assume that the survey target device 300D1 is attached to the root end such as the bottom of the column, whereas the survey target devices 300D2 and 300D3 are attached to the upper end such as the top of the column.

In this state, when the positions of the survey target devices 300D1 and 300D2 are already known by surveying, the position of the survey target device 300D2 is offset by a length of a side of the column so that tilt analysis could be done similarly to that in the case where the survey target devices are attached to the same corner. Such treatment is useful under the following unexpected circumstances such that the survey target devices could not be set at the same corner for some reasons at a construction site, or even if could be placed, one of the survey target devices may be hidden in a blind spot from the surveying device. Note that the length of a side of the column may be measured, input, and stored on site by the operator 2. Alternatively, the size information on the column may be included in the design information stored in the terminal storage unit 120 of the portable terminal device 100. Accordingly, the coordinates of the center PC of the columnar object 11 is also available by calculation.

If the columnar object is a cylindrical column, the position coordinates of any three points are measured, two perpendicular bisectors which are using the two points of the measured position are obtained, and the intersection of the perpendicular bisectors is obtained to determine the center position of the columnar object.

Figure 5:
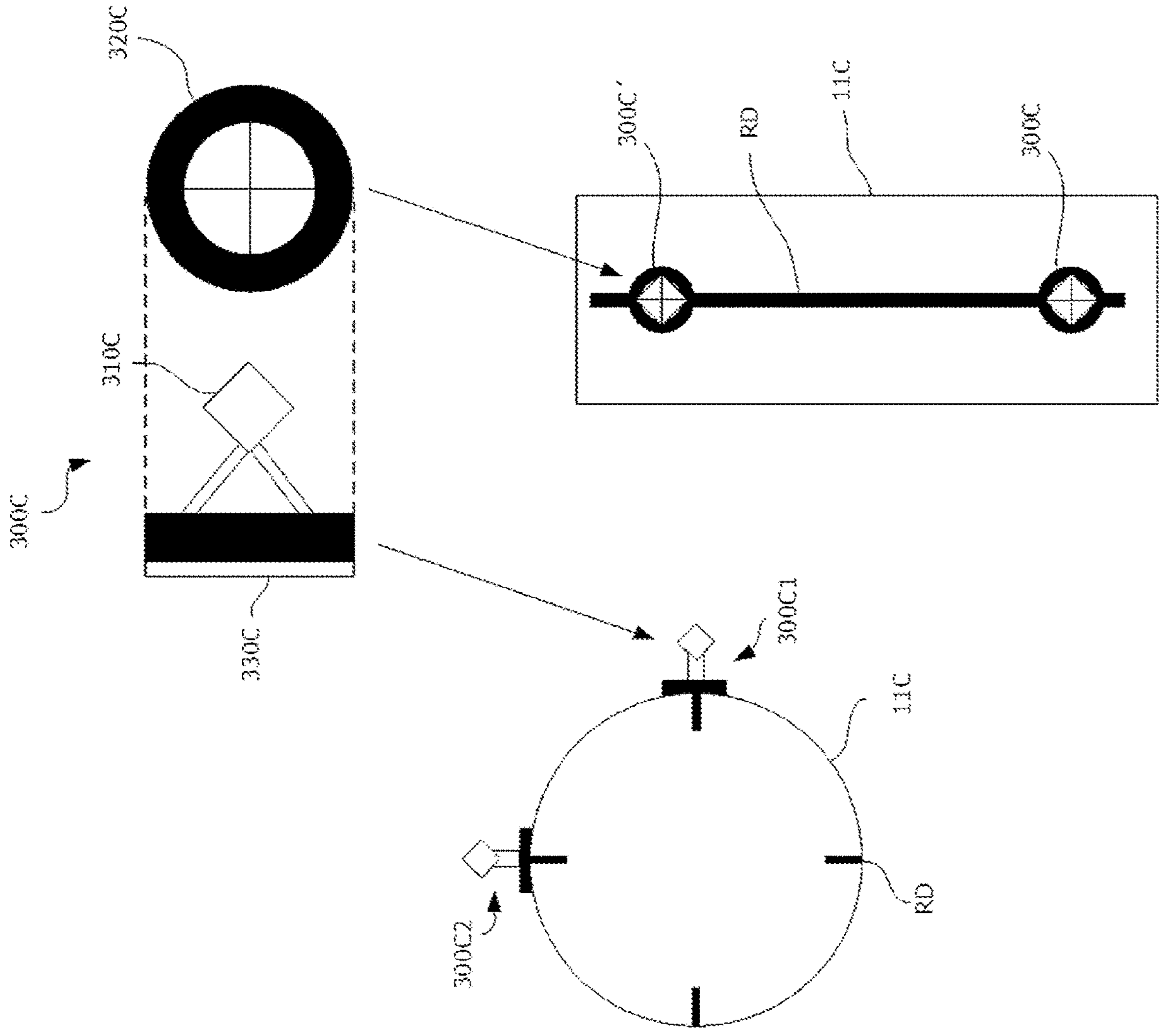
FIG. 5 illustrates an example survey target device mainly attached to a non-prism.

Tilt analysis using the columnar object 11 with alignment marks will be further described. This case, for example, allows the tilt can be easily analyzed even if the columnar object 11 is not a rectangular column. FIG. 5 illustrates a survey target device which is mainly attached to a non-rectangular column. Note that the vertical, horizontal, right, and left directions in FIG. 5 are those when the figure is oriented to make the letters readable properly. A survey target device 300C for a non-rectangular column includes a reflector 310C, an attachment portion 320C, and a guide 330C. The reflector 310C reflects surveying light. The attachment portion 320C is made of a magnetic material that exerts an attractive force on the side surface of a columnar object 11C. The guide 330C is an alignment mark which is used for position matching.

An example of the non-rectangular columnar object 11C may be a cylindrical column as shown in this figure. Note that the non-rectangular is not limited to the cylindrical column, and may be a columnar object such as an elliptic cylindrical column having a non-rectangular cross section. The columnar object 11C has alignment marks RD on it in advance. The alignment mark RD is, for example, a straight line parallel to the direction in which the column extends. Found on the left of this figure is a cross-sectional view perpendicular to the direction in which the columnar object 11C extends. As shown in the cross-sectional view, the alignment marks RD may be made at equal intervals along the circumference of the column. For example, a circular column may have, in advance, straight lines at intervals of 90°, in the direction in which the column extends.

The guide 330C is for alignment and position matching with the alignment marks RD to place the devices at intended positions. For example, the attachment portion 320C is a ring formed of a magnetic material block and having a through-hole. Attached to the back surface of the attachment portion 320C is a disk that is a light-transmitting material such as an acrylic material and has the same diameter as the attachment portion 320C. Accordingly, the operator 2 can attach each survey target device 300C at a desired point of the column in accordance with the alignment mark RD, by checking the position.

The tilt of the columnar object 11C can be analyzed by surveying the positions of such survey target devices 300C placed on the same straight line indicated as the alignment mark RD. For example, as shown in this figure, the positions of the survey target devices 300C and 300C' on the column bottom and top, respectively, are surveyed to analyze the tilt of the columnar object 11C based on these reference and column top values.

Alternatively, as an example of the variations, as shown on the left of the figure, survey target devices 300C1 and 300C2 are attached on different straight lines respectively to be surveyed. Even in this case, the offset positions are calculated based on differences in the thicknesses, radii, or diameters of the columns, or in the angles of the alignment marks (may be measured on site or may be obtained with reference to design information) to analyze the tilts. Note that this alignment through position matching with the alignment marks is also applicable to a rectangular column.

In step S105, the tilt information output unit 124 displays the tilt information on the output unit 150 of the portable terminal device 100. The tilt information includes the tilt amount in the tilt direction calculated by the tilt analysis unit 123. The output unit 150 displays the tilt amount together with the tilt direction. The acceptable tilt amount may be further displayed as the tilt information.

Output of the tilt information includes both dynamic and static ones, and hereafter they are called as dynamic tilt information and static tilt information respectively. The dynamic tilt information mainly aims to allow the operator 2 to keep checking the state of the tilt during erection adjustment work. For the purpose, the dynamic tilt information is obtained by the operator 2 analyzing the state of the tilt in real time in accordance with the position of the attached survey target device 300, while communicating with the surveying device 200. The dynamic tilt information is shown as output to the output unit 150 of the portable terminal device 100. The static tilt information, on the other hand, aims to allow a third party to check the state of the tilt after erection adjustment work, for example. For the purpose, the static tilt information indicates the recorded fixed state of the tilt as an inspection report at a predetermined analysis time. More specifically, with respect to the dynamic tilt information, when the attached position of the survey target device 300 is changed, the position is kept being tracked and surveyed all the time so that the change is being continuously shown as output to the output unit 150. That is, the tilt direction and the tilt amount are, as the dynamic tilt information, sequentially displayed in real time so that the operator 2 could keep checking the tilt direction and the tilt amount while doing the erection work or the erection modification work.

The static tilt information may be stored as history information in the terminal storage unit 120. In this case, the operator 2 manipulates, for example, the input unit 140 of the portable terminal device 100, such as a record button displayed on a touch panel display, to store the static tilt information at a predetermined analysis time.

The tilt information includes center line information generated by the tilt analysis unit 123 using the reference value, which is a straight line indicating the arrangement of a plurality of columnar objects. The output unit 150 displays the position of each columnar object and the center line passing through the columnar object. The position of each columnar object is displayed in and with the XY coordinates by using, as a reference value, an actual measurement value surveyed for each columnar object. There is thus no need to use the design information to acquire positional information on the columnar object.

Figure 6:
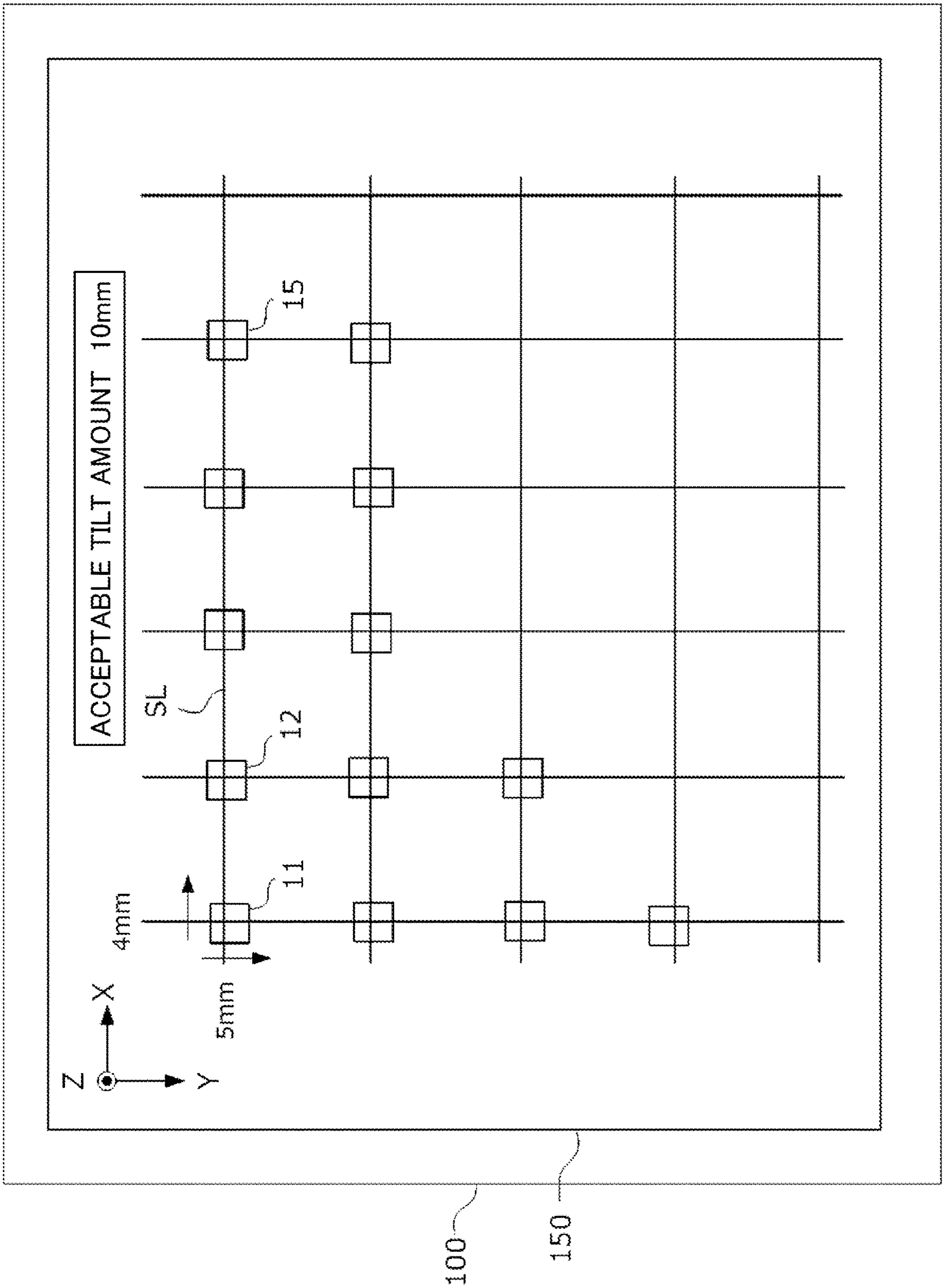
FIG. 6 is an example screen displayed on an output unit of a portable terminal device.

FIG. 6 is an example image to be displayed on the output unit 150 of the portable terminal device 100. This figure shows the static information of the columnar objects including the positions, the tilt directions, the tilt amounts, the acceptable tilt amounts, the arrangement of the columnar objects, and the center lines SL which indicates the directions in which the columnar objects are aligned. Such the static tilt information may be used by the operator 2 for temporarily checking, or as an inspection report after the erection adjustment work. With use of the values actually surveyed by the surveying device 200 on site, it is no need to use the design information for the tilt information, and it is no need to draw standard marks and lines on the columns on site to indicate the position of the columnar objects anymore.

The figure shows that the columnar object 11 tilts 4 mm in the X-direction and 5 mm in the Y-direction, for example. That is, the top of the columnar object 11 is deviated 4 mm in the X-direction and 5 mm in the Y-direction from the column bottom. Such tilt information is output as the dynamic or static tilt information. The dynamic tilt information shows clues for the operator 2 in which direction and to what extent the tilt is to be corrected while the operator 2 is doing the erection adjustment work. The static tilt information, an inspection report for a certain level of the building for example, also shows clues to help the erection adjustment work on a level above the certain level. This information is also used as an inspection report after the erection work to indicate the progress or final stage of the erection work. Storing the history of the inspection reports also facilitates grasping of the state of the erection work such as the amount of deviation of a columnar object in the progress of the construction work, an environmental change, or other factors, in comparison with the history information.

Now, the X- and Y-directions of the display on the output unit 150 of the portable terminal device 100 will be described additionally. The X- and Y-directions are those of the coordinate system set to the surveying device 200, which described above. In a local coordinate system, directions which has been set in step S101 are served as the X- and Y-directions. As a variation thereof, when the tilt information output unit 124 outputs the information on center lines passing through a plurality of columnar objects, the X- and Y-directions on the display may be changed with reference to the center lines. That is, in place of the X- and Y-directions of the coordinate system set to the surveying device 200, the center line direction can be displayed as the X- and Y-axes. For example, the tilt information output unit 124 selects a certain center line to set a line along the center line as the X-axis and a perpendicular line to the center line as the Y-axis. Accordingly, the tilt information indicating the alignment direction and tilts of a plurality of columnar objects can be output to match the X- and Y-directions.

There are other methods to display the tilt amount as follows: a method showing a numerical value such as an absolute value of a distance or angle, a method showing the size of an arrow representing the tilt amount or the length of a linear portion of the arrow representing the tilt direction, and a method showing the amount of the deviation to the center line representing the tilt amount.

In FIG. 6, there are several center lines SL, which pass through the columnar objects 11, 12, . . . 15. In structural buildings, columns are often regularly arranged in a grid. So, it is important to overview the positions and tilts of the columnar objects using the center lines in the X- and Y-directions such as X1, X2, . . . , and Y1, Y2, . . . . The calculation of each center line SL is basically to draw a straight line to pass through the center positions of the columnar objects. The center position of each columnar object is set by a reference value of the columnar object. Alternatively, the center position may be calculated using a predetermined offset value from a reference value. The offset value may be stored as design information. The center lines SL are used here for the operator 2 to grasp the overall state of the plurality of columnar objects at a glance. The information is also can be utilized for an inspection report, which is good at saving the time and work.

If the lines are calculated and drawn by connecting the center positions of the columnar objects, the lines will be in a zigzag form because the line segments connecting pairs of columnar objects are provided individually (e.g., the line segments connecting the centers of the columnar objects 11 and 12, the columnar object 12 and the next columnar object etc.). Since such lines may not be good for the purpose, so it is not adapted for the embodiment. Alternatively, the columnar objects at both ends in the area may be selected to calculate and draw a straight line connecting the centers of the columnar objects at the ends. Even if no columnar object is placed at a certain level, a columnar object may be placed on the level directly above or directly below the certain level. In this case, the position of the center of the columnar object may be displayed instead. A straight line fitted by the method of least squares, for example, may be calculated and drawn based on the respective reference values of columnar objects.

In step S106, the operator 2 grasps the states of the tilts using the tilt information to correct the tilts of the columns. As shown in FIG. 3, the operator 2 corrects the tilt of the columnar objects 11 and 12 by winding a wire 3 around both the columnar objects 11 and 12 and pulling the wire 3. At this time as well, when the dynamic tilt information is used, the positions of the survey target devices 300 are being updated in real time. Thus, the operator 2 efficiently corrects the tilt, while receiving the feedback on a result of actually pulling the wire. Note that this correction work may be done on a column-by-column basis or may be divided into multiple times on a direction-by-direction basis (e.g., the X-direction and the Y-direction). In any case, the operator 2 performs this work all by him/herself using the tilt analysis system 1 of the present disclosure. Steps S104, S105, and S106 may be executed at substantially the same time and repeatedly.

After completion of a series of such work, the erection work for one level has been finished and the work shifts to the next level. Note that a building may be divided into a plurality of bays or blocks in the horizontal direction and a plurality of levels in the vertical direction. For example, the first and second levels often roughly correspond to the first and second floors of the building.

In step S107, the erection work is conducted for a second level different from the first level. The reference value acquisition unit 121 acquires, as a different-level column top value, the third point obtained by surveying the position of the survey target device 300 attached to the top of a columnar object connected onto a different level. The different level is a level directly above and different from the level of the columnar object for which the reference value acquisition unit 121 has acquired the reference value.

Figure 7:
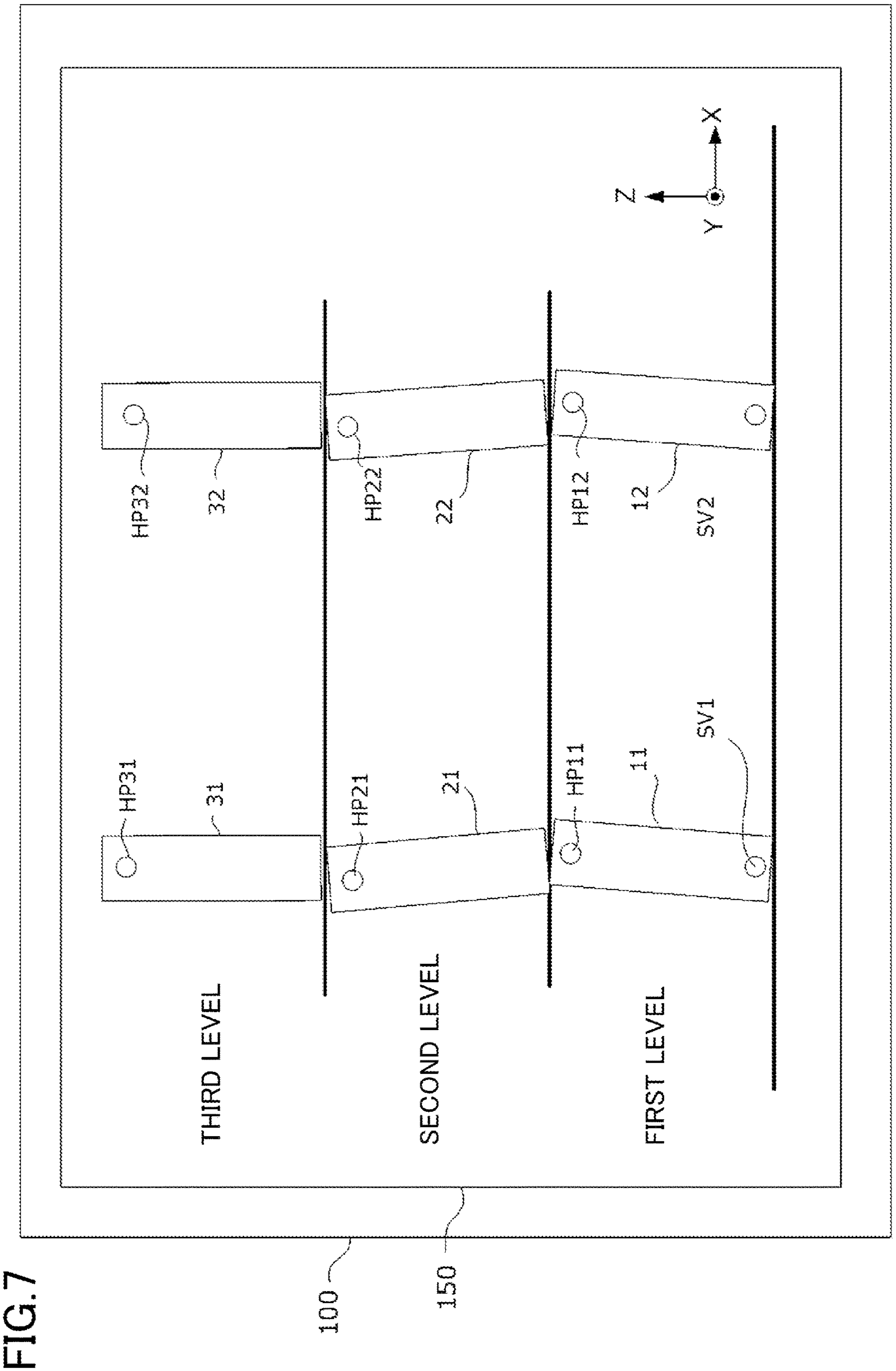
FIG. 7 is another example screen displayed on the output unit of the portable terminal device.

FIG. 7 is an example image to be displayed on the output unit 150 of the portable terminal device 100. This figure shows the tilt information on columnar objects on a plurality of level. In this figure, at the stage of step S107, analysis and adjustment work of the tilts of the columnar objects on the first level are assumed to be completed. Note that in an actual construction process as well, after correction of the tilts on a lower level has been completed, the process proceeds to an upper level.

Columnar objects 21 and 22 are placed on the second level, directly above the columnar objects 11 and 12, respectively. Here, "directly above" means not only "one level above" connected with an upper side of the column object at the current level but also "several levels above" connected each other column objects. That is, the columnar objects "directly above" the columnar object 11 on the first level include not only the columnar object 21 on the second level but also a columnar object 31 on the third level, as long as having the same XY coordinates. The same applies to the levels higher than the third level. The reference values of the columnar objects 11 and 12 are already obtained by surveying, so that they may be reused for the columnar objects 21 and 22, respectively, on a different level. There is no need to measure the reference values of the different-level columnar objects extra, which further reduces the work of the operator.

Note that the reference value acquisition unit 121 may acquire, as the reference value, the column top value of a columnar object connected directly below a different-level columnar object. To clarify a meaning of this sentence, specific levels such as a first floor and a second floor are used to explain as follows: "The columnar object connected directly below the different-level" means a columnar object on the first floor when the different-level is the second floor; The column top value of the columnar object on the first floor is used as the reference value of the columnar object on the second floor; The reference values of the columnar objects connected vertically will be different in each level. Accordingly, with the use of the position of the columnar object directly below, the different-level columnar object connected directly above can be adjusted like a level-by-level basis. In another variation, the column bottom value of a columnar object on the first level acquired as the reference value may be used as the reference value of other columnar objects on the second or higher levels; The reference value of the columnar objects connected vertically will be the same in all levels. Accordingly, the plurality of columnar objects on different levels connected vertically in the same XY coordinates are regarded as one column and the columnar objects can be adjusted as a whole.

In step S108, the tilt analysis unit 123 calculates to generate tilt information including the tilt direction based on the acquired reference value and the different-level column top value acquired by the different-level column top value acquisition unit 125. The tilt direction indicates in which direction the different-level columnar object tilts. More specifically, the tilt analysis unit 123 generates the tilt information on the columnar object 21 using, for example, a reference value SV1 and a column top value HP21 shown in FIG. 7. The reference value SV1 is the reference value of the columnar object 11 on the first level. The column top value HP21 is the column top value of the columnar object 21 on the second level, that is, a different-level column top value. With use of the reference value of the first level, the tilts of the columns on the levels above the first levels are analyzed each level by each, which leads to efficient erection work.

In step S109, the tilt information on the second level is displayed. At this time, the tilt information on the second level may be displayed on a level-to-level basis as shown in FIG. 6. Alternatively, the tilt information on a plurality of levels may be displayed. For example, the tilt information on a plurality of levels may be displayed in cross sections along center lines. FIG. 7 shows an example thereof. The tilt information may be displayed for a plurality of levels in this manner. The tilt information on the plurality of levels allows overall grasping of the tilts of the columnar objects of the whole building. Note that while this figure shows that all the columnar objects tilted, the tilts of the columnar objects on one level are to be corrected, and then the process proceeds to the next level. The tilt information on the plurality of levels may be shown in a perspective view or three-dimensionally. The three-dimensional display may show tilts exaggerated, because a precisely expressed, extremely slight amount of tilt is not easily and instinctively grasped by the operator.

Figure 8:
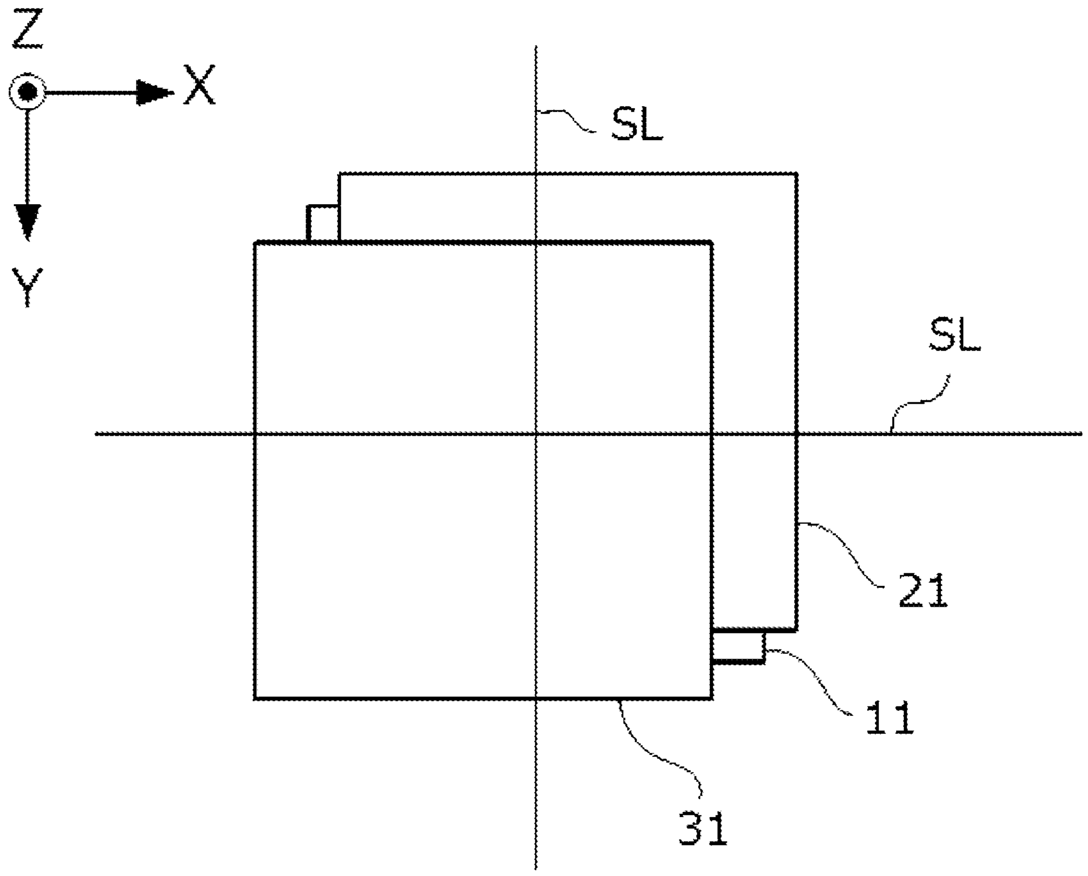
FIG. 8 is further another example screen displayed on the output unit of the portable terminal device.

FIG. 8 is an example image showing tilt information on a plurality of levels, to be displayed on the output unit 150 of the portable terminal device 100. This figure shows the columnar objects 21 and 31 overlapping each other. The columnar object 21 is placed on a higher level directly above the columnar object 11. The columnar object 31 is placed on a higher level, directly above the columnar object 21. This displays the misalignments of the columnar objects to be arranged in the same XY coordinates so as to be easily and intuitively grasped by that the operator 2. In this case, only one pair of center lines may be sufficient. With use of the center lines SL corresponding to the position of the columnar object for which the reference value has been acquired, the states of the tilts are more easily grasped. For example, assume that the reference value is the column bottom value of the first level. In this case, the center lines SL corresponding to the position of the columnar object 11 on the first level can be used, which clarifies the misalignments of the columnar objects on the second and third levels. For example, if the reference value is acquired from the columnar object on the second level, the center lines SL according to the position of the columnar object may be shown. For example, assume that no columnar object exists on a certain level but a different-level columnar object exists directly below or above the certain level. The center lines SL according to the reference value of the different-level columnar object may be shown.

In order to clarify which columnar object belongs to which level, the overlapping columnar objects may be displayed in different colors, different types of lines (e.g., a solid line or a broken line), or lines with different thicknesses determined from level to level. The present disclosure is not limited to the examples described above. Various displays may be employed for the tilt information on a plurality of levels.

In step S110, the operator 2 works to correct the tilt of each columnar object on the second level based on the static tilt information on the previous level or the dynamic tilt information on the second level itself. Since this process is basically similar to that in step S106, description thereof will be omitted. The same applies to the third level to the N-th levels that are higher than the second level. With correction of the tilts of the columnar objects on the levels, erection of the whole building is completed.

A case will be described when the surveying device 200 is moved. While there are a lot of columnar objects at a construction site, not all of them are visible from the initial location of the surveying device 200. In this case, the surveying device 200 needs to be moved to a new place, and the surveying device 200 is set to a new device point (through any point placement). First, as input to the surveying device 200, two or more points of the column bottom values of columnar objects are selected to be input and the points that are already known by surveying before movement of the device. Next, the survey target devices 300 are attached to the bottoms of the columnar objects so that the surveying device 200 performs surveying. Accordingly, the surveying device 200 uses the local coordinate system obtained at the previous device point. That is, the surveying device 200 outputs the information on the columnar objects and their tilt information newly acquired in the new place, using the same local coordinate system.

Figure 9:
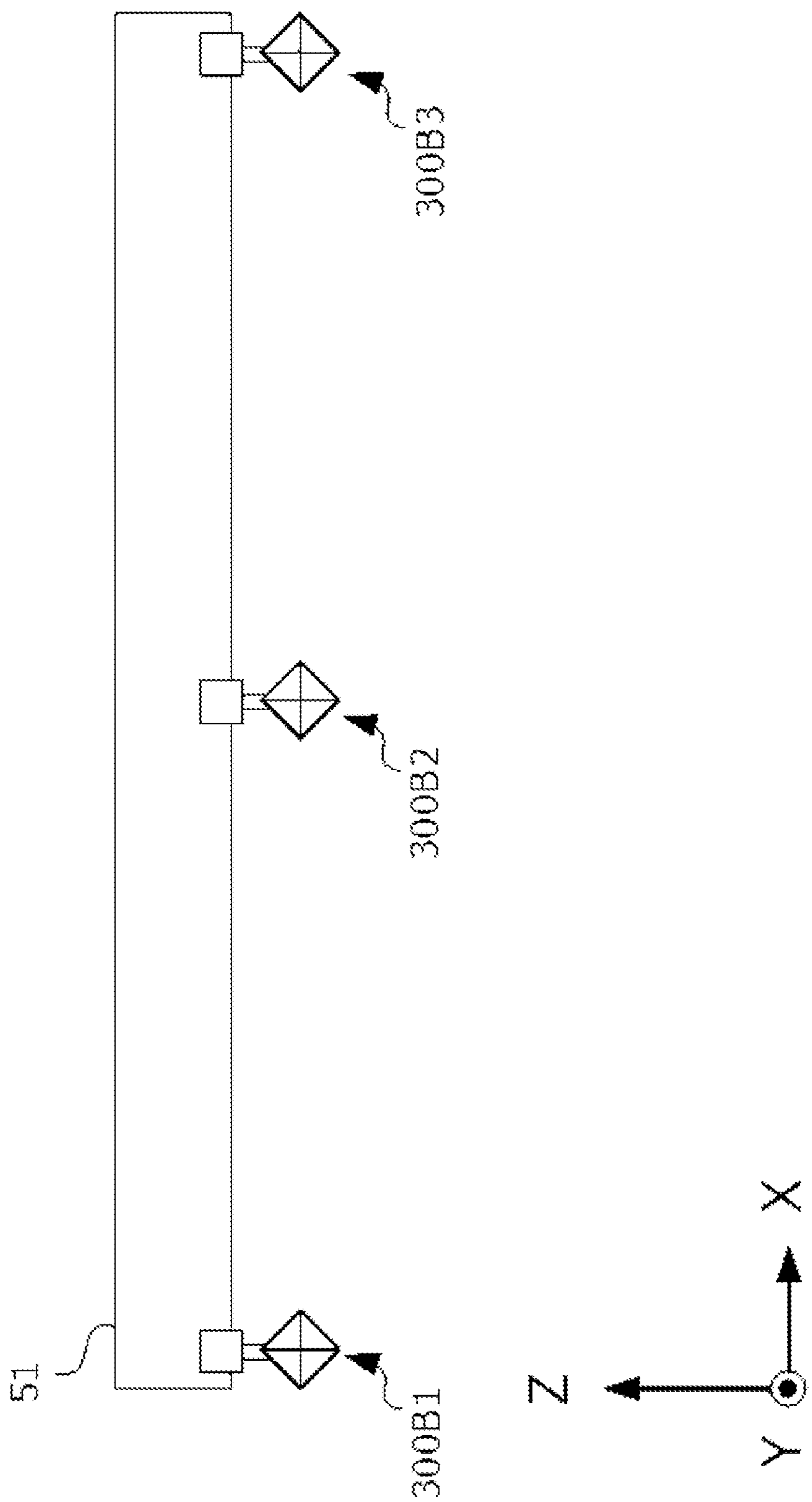
FIG. 9 is a schematic view for illustrating analysis of a beam state.

Finally, analysis of a beam state will also be described as an applied example of analysis of a columnar object. FIG. 9 is a schematic view for illustrating analysis of a beam state. Beams are arranged horizontally between columns. The state of each beam may also be analyzed by applying the tilt analysis system of the present disclosure.

As shown in this figure, survey target devices 300B1 and 300B3 are placed at one and the other ends of a beam 51 extending horizontally. A survey target device 300B2 is then placed around the center of the beam 51 with respect to both the ends. In order to place the survey target device 300B2 at an appropriate position, a guide to an estimated position may be displayed on the beam in advance. The positions of the survey target devices 300B1, 300B2, and 300B3 are surveyed by a procedure similar to that of the tilt analysis. In one preferred embodiment, these survey target devices are placed at the same corner of the same beam for surveying. For example, in this case, the reference value of the position of the beam 51 is one of the positions of the survey target devices 300B1 and 300B3 at both the ends of the beam 51. The position of the other end not selected as the reference value may serve as a distal end value, for example. The center value represents the position of the survey target device 300B2 around the center.

The tilt analysis unit 123 then analyzes the state, such as whether the beam 51 extends horizontally or deflects, based on the reference value, distal end value, and center value acquired by surveying. For example, the levelness of the placed beam 51 can be calculated based on the reference and distal end values indicating the positions of both ends of the beam 51. More specifically, the levelness can be calculated by comparing the Z coordinates of the reference and distal end values. In addition, the deflection of the beam 51 can be calculated using the differences among the Z coordinates of the center and the Z coordinates of both ends (in other words, the difference among the Z coordinates of the center value and the Z coordinates of the reference value and the difference among the Z coordinates of the center value and the Z coordinates of the distal end value).

The information on the beam 51 may be added, output, and displayed as the tilt information on a columnar object. In this case, the position of the beam according to the XYZ coordinates of the reference, distal end, and center values of the beam 51 may be additionally displayed as the tilt information on the columnar object. In addition, the calculated levelness and deflection may be displayed.

As described above, the tilt analysis system, the tilt analysis method, and the tilt analysis program of the embodiment of the present disclosure includes: the surveying device 200 configured to survey the position of the survey target device 300 by irradiating the survey target device 300 with surveying light; the survey target device 300 including the attachment portion 320 to be attached to the columnar object 11, and the reflector 310 that reflects the surveying light; the portable terminal device 100 including the output unit 150; the reference value acquisition unit 121 configured to acquire, as the reference value, the first point obtained by surveying the position of the survey target device 300 attached to the bottom of the columnar object 11 using the surveying device 200; the column top value acquisition unit 122 configured to acquire, as the column top value indicating the position of the column top, the second point obtained by surveying the position of the survey target device 300 attached to the top of the columnar object 11 using the surveying device 200; the tilt analysis unit 123 configured to generate the tilt information including the tilt direction based on the reference value acquired by the reference value acquisition unit 121 and the column top value acquired by the column top value acquisition unit 122, the tilt direction indicating in which direction the columnar object 11 tilts; and the tilt information output unit 124 configured to output, to the output unit, the tilt information generated by the tilt analysis unit 123. This configuration facilitates the erection adjustment work of a columnar object after erection to be done, even by one person.

The tilt information includes the tilt amount in the tilt direction calculated by the tilt analysis unit 123. The output unit displays the tilt amount together with the tilt direction, which provides a specific clue to the operator 2, who corrects the posture of the columnar object, in which direction and to what extent the posture is to be corrected.

The tilt information further includes the acceptable tilt amount calculated based on the height of the columnar object calculated by the tilt analysis unit 123 using the reference value acquired by the reference value acquisition unit 121 and the column top value acquired by the column top value acquisition unit 122. This configuration allows grasping of the acceptable tilt amount on site and erection adjustment work to meet the accuracy criteria.

The tilt information further includes the center line information that is the straight line indicating arrangement of the plurality of columnar objects generated by the tilt analysis unit 123 using the reference value acquired by the reference value acquisition unit 121. The output unit 150 displays the position of each of the plurality of columnar objects with respect to the reference value acquired by the reference value acquisition unit 121 and the center line SL passing through the columnar object. This configuration allows the operator 2 to grasp the overall state of the plurality of columnar objects at a glance.

The different-level column top value acquisition unit 125 acquires, as the different-level column top value, the third point obtained by surveying the position of the survey target device 300 attached to the top of the different-level columnar object connected onto the different level, using the surveying device 200. The different level is the first level directly above and different from the level of the columnar object for which the reference value acquisition unit 121 has acquired the reference value. The tilt analysis unit 123 generates the tilt information including the tilt direction based on the reference value and the different-level column top value acquired by the different-level column top value acquisition unit 125. The tilt direction indicates in which direction the different-level columnar object tilts. Accordingly, the erection work of a shaped object progresses efficiently, utilizing the already acquired reference value.

The tilt analysis system further includes: the different-level column top value acquisition unit 125 configured to acquire, as the different-level column top value, the third point obtained by surveying the position of the survey target device 300 attached to the top of the different-level columnar object connected onto the different level, using the surveying device 200. The different level is the second level above and different from the level of the columnar object for which the reference value acquisition unit 121 has acquired the reference value. The reference value acquisition unit 121 acquires, as the reference value, the column top value of the columnar object connected directly below the different-level columnar object. The tilt analysis unit generates the tilt information including the tilt direction based on the reference value and the different-level column top value acquired by the different-level column top value acquisition unit. The tilt direction indicates in which direction the different-level columnar object tilts. Accordingly, the erection work of a shaped object progresses efficiently, utilizing the already acquired column top value.

The tilt information includes the tilt information on the plurality of columnar objects on the plurality of levels, which allows overall grasping of the tilts of the columnar objects of the whole building.

The survey target device 300 of the embodiment of the present disclosure aims to analyze the tilt of the columnar object 11 that is magnetic and has the rectangular cross section. The survey target device 300 includes: the reflector 310 configured to reflect the surveying light back to the surveying device 200 that surveys the position of the survey target device 300 by irradiating the survey target device 300 with the surveying light; the first planar portion 321 and the second planar portion 322 that abut on the first side surface and the second side surface, respectively, which sandwich the corner of the columnar object 11. The first planar portion 321 and the second planar portion 322 are arranged perpendicularly to each other. The first planar portion 321 and the second planar portion 322 are magnetic. This configuration allows the attachment of the survey target device to a columnar object that is a rectangular column without any displacement in the direction in which the column extends. This results in accurate analysis of a tilt.

The survey target device 300C of the embodiment of the present invention aims to analyze the tilt of the columnar object 11C that is magnetic and has, in advance, the alignment mark RD indicating the point in the direction in which the column extends and in the circumferential direction. The survey target device 300C includes: the reflector 310C configured to reflect the surveying light back to the surveying device 200 that surveys the position of the survey target device 300C by irradiating the survey target device 300C with the surveying light; the attachment portion 320C made of the magnetic material that exerts an attractive force on the columnar object; and the guide 330C configured to match the position with the alignment mark RD. This configuration allows the attachment of the survey target device to the columnar object in any of various shapes without causing any displacement in the direction in which the column extend. This results in accurate analysis of the tilt.

The embodiment of the present disclosure has been described above, but the aspects of the present disclosure are not limited to the embodiment.

DESCRIPTION OF REFERENCE CHARACTERS

- 1 Surveying System
- 2 Operator
- 3 Wire
- 11, 12, 15, 21, 22, 31, 32 Columnar Object
- 51 Beam
- 100 Portable Terminal Device
- 110 Terminal Processing Unit
- 120 Terminal Storage Unit
- 121 Reference Value Acquisition Unit
- 122 Column Top Value Acquisition Unit
- 123 Tilt Analysis Unit
- 124 Tilt Information Output Unit
- 125 Different-Level Column Top Value Acquisition Unit
- 130 Terminal Communication Unit
- 140 Input Unit
- 150 Output Unit
- 200 Surveying Device
- 210 Surveying Unit
- 211 Distance Measurement Unit
- 212 Angle Measurement Unit
- 220 Surveying Storage Unit
- 230 Surveying Communication Unit
- 240 Surveying Control Unit
- 250 Tracking Control Unit
- 300 Survey Target Device
- 310 Reflector
- 320 Attachment Portion
- SL Center Line
- RD Alignment Mark
- SV1, SV2 Reference Value
- HP11, HP12, HP21, HP22, HP31, HP32 Column Top Value

What is claimed is:

1. A column adjustment method for adjusting a tilt of a columnar object on a construction site, the column adjustment method comprising:

placing a surveying device at any place on the construction site toward an alignment direction, the surveying device comprising an angle measuring unit configured to measure a horizontal angle and a vertical angle of a collimation direction, a distance measuring unit configured to measure a distance to a survey target device utilizing surveying light, and a surveying communication unit configured to communicate with a portable terminal device, the portable terminal device comprising a terminal processing unit comprising at least one processor and a memory, the terminal processing unit being configured to instruct the surveying device;

attaching a survey target device including a reflector at a base of the columnar object;

surveying, by the surveying device under instruction from the portable terminal device, XYZ position coordinates of the first survey target device to acquire a reference value;

attaching a survey target device including a reflector near the top of the columnar object;

tracking and surveying, continuously in real time by the surveying device, XYZ position coordinates of the second survey target device to repeatedly acquire a column-top value;

receiving, by the portable terminal device carried by a single worker, measurement results from the surveying device;

generating, continuously in real time by the processor of the portable terminal device, dynamic tilt information based on the reference value and the repeatedly acquired column-top value, the dynamic tilt information comprising a tilt direction and a tilt amount of the columnar object in an XY plane;

displaying, on an output unit of the portable terminal device being looked at by the single worker, the dynamic tilt information updated in real time; and adjusting, by the single worker, a posture of the columnar object by pulling a wire connected to the columnar object while simultaneously checking the dynamic tilt information displayed on the output unit of the portable terminal device to obtain feedback on the adjustment.

2. A column adjustment method for adjusting a tilt of a columnar object on a construction site, the column adjustment method comprising:

placing a surveying device at any place on the construction site toward an alignment direction, the surveying device comprising an angle measuring unit configured to measure a horizontal angle and a vertical angle of a collimation direction, a distance measuring unit configured to measure a distance to a survey target device utilizing surveying light, and a surveying communication unit configured to communicate with a portable terminal device, the portable terminal device comprising a terminal processing unit comprising at least one processor and a memory, the terminal processing unit being configured to instruct the surveying device;

attaching a survey target device including a reflector at a base of the columnar object;

surveying, by the surveying device under instruction from the portable terminal device, XYZ position coordinates of the survey target device located at the base of the columnar object to acquire a reference value;

relocating the survey target device including the reflector to a location near the top of the columnar object;

tracking and surveying, continuously in real time by the surveying device, XYZ position coordinates of the survey target device located near the top of the columnar object to repeatedly acquire a column-top value;

receiving, by the portable terminal device carried by a single worker, measurement results from the surveying device;

generating, continuously in real time by the processor of the portable terminal device, dynamic tilt information based on the reference value and the repeatedly acquired column-top value, the dynamic tilt information comprising a tilt direction and a tilt amount of the columnar object in an XY plane;

displaying, on an output unit of the portable terminal device being looked at by the single worker, the dynamic tilt information updated in real time; and adjusting, by the single worker, a posture of the columnar object by pulling a wire connected to the columnar object while simultaneously checking the dynamic tilt information displayed on the output unit of the portable terminal device to obtain feedback on the adjustment.

* * * * *